US008581986B2

(12) United States Patent
Colla et al.

(10) Patent No.: US 8,581,986 B2
(45) Date of Patent: Nov. 12, 2013

(54) METHOD AND APPARATUS FOR MEASURING THE FOCUS PERFORMANCE OF A CAMERA AND LENS COMBINATION

(75) Inventors: Gianluca Colla, Reggio Emilia (IT); Andrea Benedetti, Rome (IT)

(73) Assignee: Datacolor Holding AG, Luzern (CH)

( * ) Notice: Subject to any disclaimer, the term of this patent is extended or adjusted under 35 U.S.C. 154(b) by 309 days.

(21) Appl. No.: 13/098,780

(22) Filed: May 2, 2011

(65) Prior Publication Data

US 2012/0050543 A1 Mar. 1, 2012

Related U.S. Application Data

(60) Provisional application No. 61/378,365, filed on Aug. 30, 2010.

(51) Int. Cl.
*H04N 17/00* (2006.01)
*H04N 17/02* (2006.01)
*G03B 13/00* (2006.01)

(52) U.S. Cl.
USPC .......... 348/187; 348/188; 348/345; 348/349; 348/353

(58) Field of Classification Search
USPC .......................... 348/187, 188, 345, 349, 353
See application file for complete search history.

(56) References Cited

U.S. PATENT DOCUMENTS

| 6,781,621 | B1 * | 8/2004 | Gobush et al. | 348/157 |
|---|---|---|---|---|
| 7,626,634 | B2 * | 12/2009 | Ohki et al. | 348/373 |
| 8,139,138 | B1 * | 3/2012 | Tapes et al. | 348/345 |
| 2010/0091104 | A1 * | 4/2010 | Sprigle et al. | 348/136 |
| 2012/0050543 | A1 * | 3/2012 | Colla et al. | 348/187 |
| 2013/0063558 | A1 * | 3/2013 | Phipps | 348/43 |

* cited by examiner

*Primary Examiner* — Nhan T Tran
*Assistant Examiner* — Xi Wang

(57) ABSTRACT

In one embodiment, the present invention is a method and apparatus for measuring the focus performance of a camera and lens combination. One embodiment of a test target for measuring a focus performance of a camera and lens combination includes a target body, the target body displaying a pattern including: a primary pattern covering a portion of the target body and a secondary pattern superimposed over a portion of the primary pattern, the secondary pattern being aligned along an edge of the target body. The test target also includes a ruler positioned adjacent to the edge of the target body, a ruler positioned adjacent to the edge of the target body, such that the secondary pattern directly abuts a zero line of the ruler.

16 Claims, 5 Drawing Sheets

METHOD AND APPARATUS FOR MEASURING THE FOCUS PERFORMANCE OF A CAMERA AND LENS COMBINATION

CROSS REFERENCE TO RELATED APPLICATIONS

This application claims the benefit of U.S. Provisional Patent Applications Ser. No. 61/378,365, filed Aug. 30, 2010, which is herein incorporated by reference in its entirety.

FIELD OF THE INVENTION

The present invention generally relates to the field of photography, and more specifically relates to the calibration of image capturing devices.

BACKGROUND

An autofocus optical system uses a sensor, a control system, and a motor to focus fully automatically or manually on a selected point or area. Cameras and other image capturing devices have used built-in autofocus systems for many years, and yet many photographers still struggle with the accuracy and repeatability of these systems.

Autofocus is a great convenience, especially in fast shooting situations; however, autofocus error still causes many images to be improperly focused. Photographers tend to blame the improper focus on the camera choosing the wrong object (or the wrong point on the object) as the focal point. However, another possibility is that the autofocus feature is simply not functioning properly. In such cases, the photographer may have to return the lens and/or camera body back to the manufacturer for recalibration or replacement. This option can be both time consuming and expensive.

SUMMARY OF THE INVENTION

In one embodiment, the present invention is a method and apparatus for measuring the focus performance of a camera and lens combination. One embodiment of a test target for measuring a focus performance of a camera and lens combination includes a target body, the target body displaying a pattern including: a primary pattern covering a portion of the target body and a secondary pattern superimposed over a portion of the primary pattern, the secondary pattern being aligned along an edge of the target body. The test target also includes a ruler positioned adjacent to the edge of the target body, a ruler positioned adjacent to the edge of the target body, such that the secondary pattern directly abuts a zero line of the ruler.

BRIEF DESCRIPTION OF THE DRAWINGS

The teachings of the present invention can be readily understood by considering the following detailed description in conjunction with the accompanying drawings, in which.

DETAILED DESCRIPTION

In one embodiment, the present invention is a method and apparatus for measuring the focus performance of a camera and lens combination. Embodiments of the invention aid a photographer in correcting the autofocus feature of his camera for use with a particular camera and lens combination. This correction data may be stored in the camera for later use with the same camera and lens combination. Thus, the present invention may be used to easily calibrate the interchangeable lenses that may be used with modern cameras such as modern digital single-lens reflex (DSLR) cameras.

Figure 1:
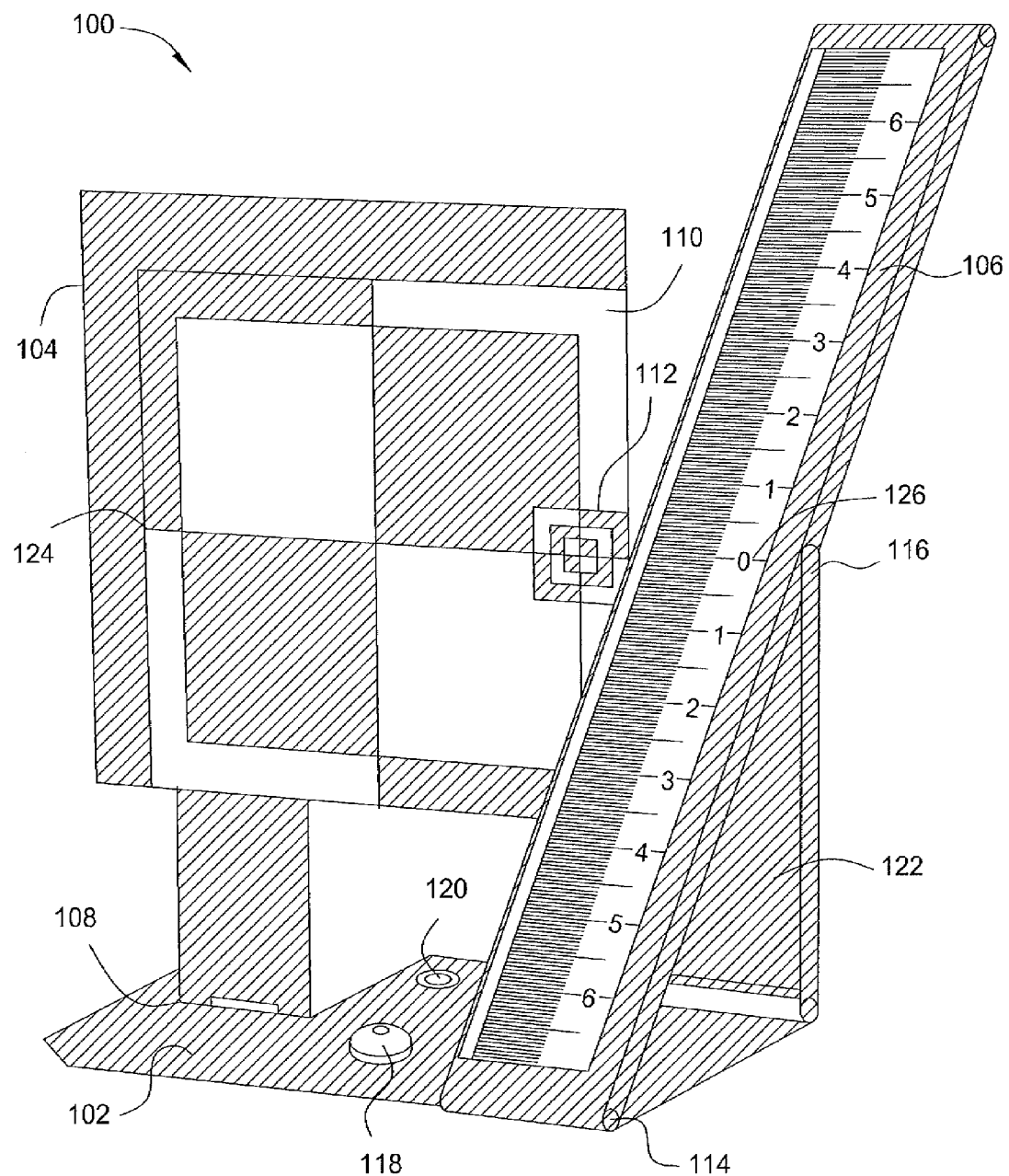
FIG. 1 illustrates one example of a test target, according to the present invention.
Figure 2:
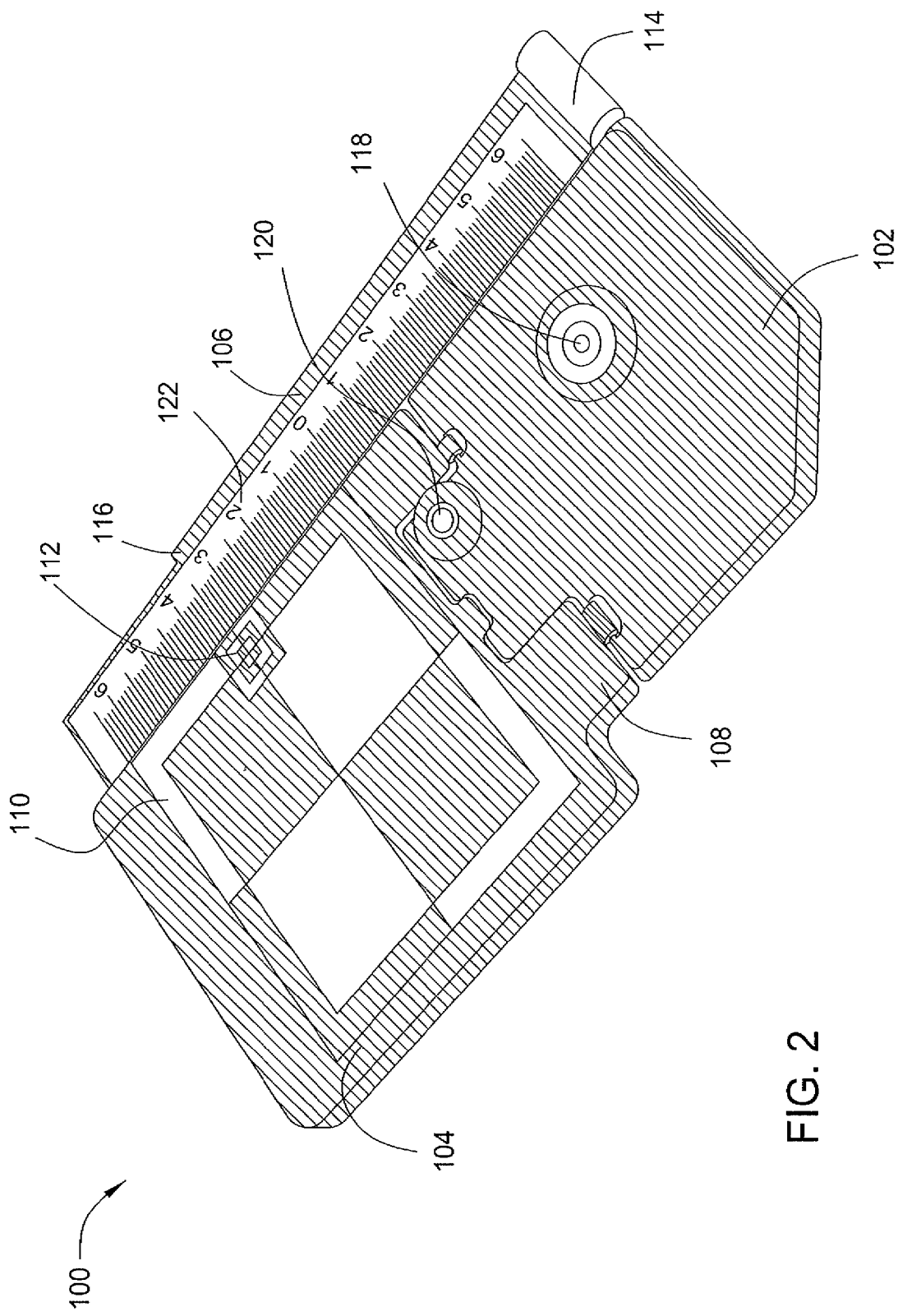
FIG. 2 illustrates the test target of FIG. 1 in its compact form.

In particular, the present invention provides a portable test target that allows the photographer to check the camera and lens calibration on-site. FIG. 1 illustrates one example of a test target 100, according to the present invention. FIG. 2 illustrates the test target 100 of FIG. 1 in its compact form. With reference to FIGS. 1 and 2, the test target 100 generally comprises a base 102, a target body 104, and a ruler 106.

The target body 104 is mounted to the base 102. In one embodiment, the target body 104 is mounted to the base 102 via one or more hinges 108. The hinges 108 allow the target body 104 to be folded down flush with the base 102 as illustrated in FIG. 2 (e.g., for transport of the test target 100) or to be rotated upward so that the target body 104 is positioned in a substantially perpendicular orientation relative to the base 102 as illustrated in FIG. 1 (e.g., for use). In one embodiment, the target body 104 is formed of a sturdy plastic resin.

Printed on the face of the target body 104 is a high contrast two-toned (e.g., black and white) pattern. For example, the pattern may comprise white markings printed on a black target body 104. In one embodiment, the pattern is substantially rectangular in shape. For instance, in one embodiment, a primary pattern 110 covers a majority of the target body 104 and comprises a square divided into four substantially equally sized quadrants. Two of the quadrants are black, and two of the quadrants are white. The black quadrants are positioned diagonally from each other, and the white quadrants are also positioned diagonally from each other. A perimeter around the square is also black and white. The portions of the perimeter that contact the black quadrants are white, while the portions of the perimeter that contact that white quadrants are black.

In addition, a smaller secondary pattern 112 having substantially the same configuration as the primary pattern 110 is superimposed over a portion of the primary pattern 110 and is aligned along an edge of the target body 104 In particular, the secondary pattern 112 is superimposed over a portion of the perimeter and over portions of two quadrants (i.e., the two quadrants closest to the ruler 106) of the primary pattern 110. In one embodiment, the secondary pattern 112 includes an additional second perimeter surrounding a first perimeter. The second perimeter is also black and white, where the black portions of the second perimeter contact the white portions of the first perimeter, and the white portions of the second perimeter contact the black portions of the first perimeter. The secondary pattern 112 is a high resolution pattern.

In one embodiment, the secondary pattern 112 is superimposed over a portion of the perimeter (and two corresponding quadrants) of the primary pattern 110 that abuts the zero marking on the ruler 106 (when the test target 100 is in its unfolded position as illustrated in FIG. 1). In one embodiment, the primary pattern 110 and the secondary pattern 112 share a horizontal center line 124 (i.e., a line that separates the upper two quadrants from the lower two quadrants in the primary pattern 110 and the secondary pattern 112). This horizontal center line 124 is also the zero marking on the ruler 106 when the test target 100 is in its unfolded position; thus, the secondary pattern 112 is precisely lined up with the ruler's zero marking. Moreover, the secondary pattern 112 directly abuts the ruler's zero marking (i.e., there is no perimeter or other optical pattern or surface between the edge of the secondary pattern 112 and the zero marking). Thus, the small, highly resolved secondary pattern 112 is positioned right at the focal point of the camera when the text target 100 is in its unfolded position. This allows the depth-of-field and the resolution of the lens to come from the focal center of the lens. In one embodiment, the secondary pattern 112 is less than or equal to approximately one fourth the size of one of the quadrants of the primary pattern 110. The position and smaller size of the secondary pattern 112 relative to the primary pattern 110 makes for minimal visual "clutter" on the target body 104.

An extension 122 is coupled to the target body 104 for structural purposes (i.e., the extension 122 is not a part of the target). The extension 122 includes a flange 116 that defines a small shelf when the target body 104 is rotated upward.

The ruler 106 is positioned adjacent to the target body 104 and is also mounted to the base 102. In one embodiment, the ruler 106 is mounted to the base 102 via one or more hinges 114. The hinges 114 allow the ruler 106 to be folded down flush with the base 102 as illustrated in FIG. 2 (e.g., for transport of the test target 100) or to be rotated upward so that the ruler 106 forms an acute angle relative to the base 102 as illustrated in FIG. 1 (e.g., for use).

Figure 6:
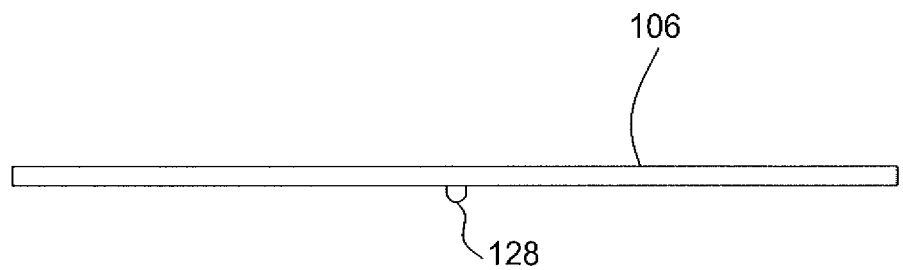
FIG. 6 illustrates a side view of the ruler, allowing the lip to be viewed.

In one embodiment, the ruler 106 is formed of a sturdy plastic resin. In one embodiment, the ruler 106 comprises a white inlay (formed, e.g., of plastic) having black markings. In one embodiment, the back of the ruler 106 (i.e., the side without the markings) includes a lip approximately at a midpoint (e.g., the zero line) along the length of the ruler 106. FIG. 6, for example, illustrates a side view of the ruler 106, allowing the lip 128 to be viewed. The lip 128 allows the ruler 106 to be locked into place against the shelf defined by the flange 116 that rotates upward with the extension 122 (e.g., as illustrated in FIG. 1). The flange 116 may also be folded flush with the base 102 (e.g., as illustrated in FIG. 2).

When the ruler 106 is rotated upward and locked into place, the zero line 126 of the ruler 106 is substantially even with the horizontal center line 124 of the primary pattern 110 and the secondary pattern 112. The zero line 106 represents the midpoint of the ruler 106 and is the focal point of a camera in three dimensions.

In one embodiment, the test target 100 further comprises a tripod mount 120 formed in the base 102. The tripod mount 120 is a threaded hole that allows the test target 100 to be mounted to a tripod. The base 102 may also include a level 118 (i.e., a device used to measure true horizontal or relative heights). For example, the level 118 may be a bubble level.

Figure 3:
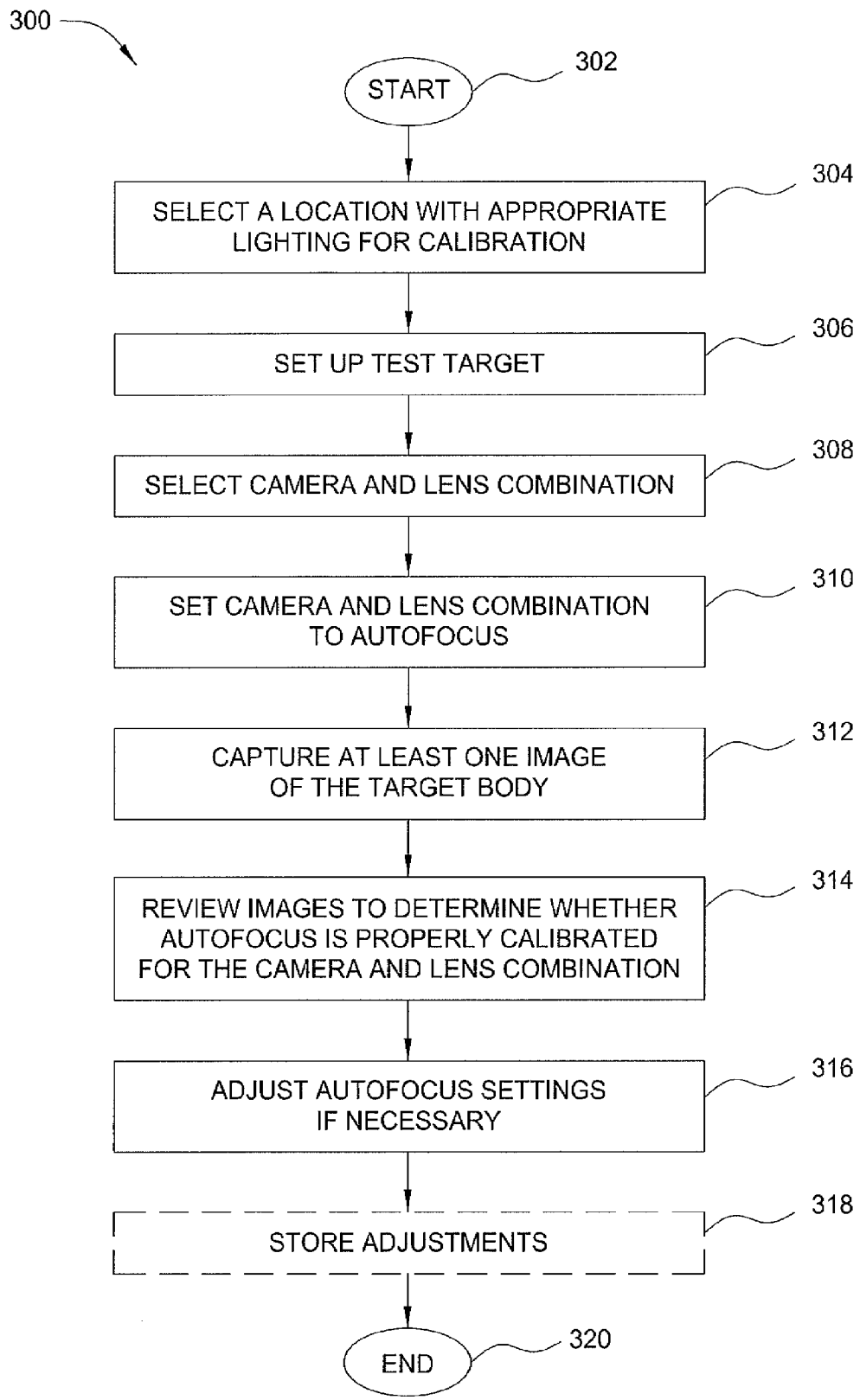
FIG. 3 is a flow diagram illustrating one embodiment of a method for using the test target illustrated in FIGS. 1-2.

FIG. 3 is a flow diagram illustrating one embodiment of a method 300 for using the test target 100 illustrated in FIGS. 1-2. Specifically, the method 300 illustrates how to use the test target to calibrate the autofocus feature for a given camera and lens combination.

The method 300 starts in step 302. In step 304, the user selects a location with appropriate lighting for the autofocus calibration. In one embodiment, the lighting must not be too dark or contain too much uncontrolled light directly behind the camera. Light from other angles in front of the target location is generally acceptable.

In step 306, the user sets up the test target 100. As discussed above, the test target 100 is opened from its flat locking position (e.g., as illustrated in FIG. 2), and the ruler 106 is positioned in the correct orientation with the target body 104 (e.g., as illustrated in FIG. 1). The test target 100 is then placed on a substantially flat and level surface. In one embodiment, the test target 100 is mounted on a tripod, via the tripod mount 120. The level 118 may be used to determine the most effective alignment of the tripod with the camera.

In step 308, the user selects the camera and lens combination. The user may elect to calibrate several lenses in combination with a given camera in order to determine the range of autofocus settings. In one embodiment, the camera is a DLSR camera or other camera capable of storing lens autofocus corrections, and the lens is an auto-focus lens capable of being driven by the camera.

In step 310, the user sets the camera and lens combination to autofocus. In one embodiment, the camera is also set to the most open aperture setting available (e.g., 4.0 or 2.8 on many cameras). This produces the clearest example of the focal plane. The camera may need to be in aperture priority mode or manual mode in order to correctly set the aperture.

In step 312, the camera is used to capture at least one image of the target body 104 (i.e., specifically the test pattern). In one embodiment, the camera is aimed at the center of the primary pattern 110 to be sure that the camera autofocuses on the correct plane. In another embodiment, the central focusing point of the camera is aimed at the edge of the secondary pattern 112, at the exact zero point of the ruler 106, for improved calibration accuracy. However, because this practice may in some cases disrupt the camera's auto-focus performance (due to the discontinuity of the surface at the attended point), another embodiment approximates this focus by aiming the camera at the center of the secondary pattern 112. This allows the neighborhood of a single point to be assessed simultaneously in three dimensions. This also minimizes any error caused by not having the test target 100 orientated exactly perpendicular to the axis of the lens. In fact, even when the test target 100 is orientated exactly perpendicular to the axis of the lens, there will still be some focal distance error when focus off the lens axis is considered (e.g., as when the initial autofocus focuses on the middle of the primary pattern 110).

As discussed above, there may be situations in which the ideal location to aim the camera is not at the edge of the secondary pattern 112. For instance, cameras that have large focusing points (e.g., digital-single lens reflex cameras using wide angle lenses) will tend to include both the secondary pattern 112 and the ruler 106 inside the focusing point area, causing inconsistency and error in focusing performance.

Figure 4:
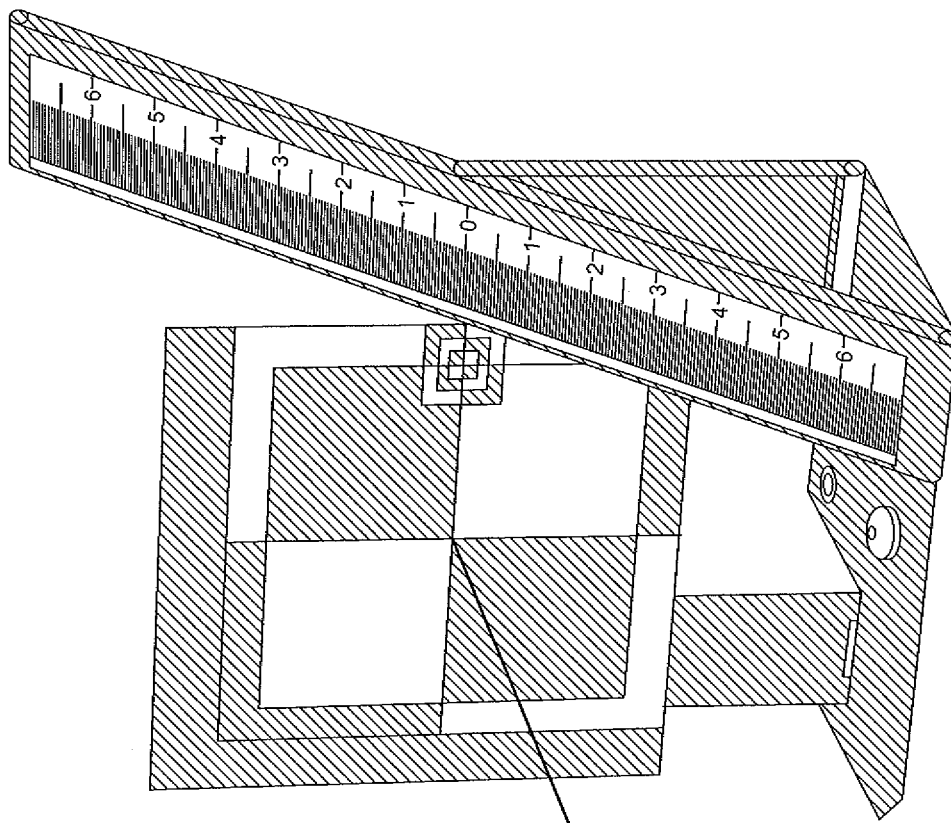
FIG. 4 illustrates a configuration of camera and test target in which the camera is positioned to capture an image of the target body.
Figure 4:
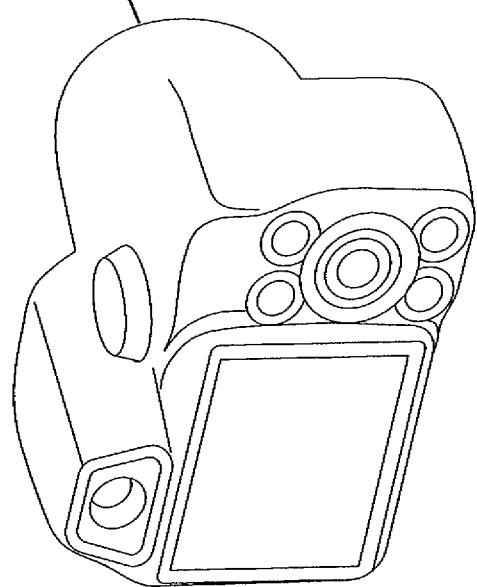

If the camera highlights the chosen focus point (e.g., the center of the primary pattern 110 or the center of the secondary pattern 112), then this confirms that the target plane has been selected as the intended focus plane. FIG. 4 illustrates a configuration of camera and test target 100 in which the camera is positioned to capture an image of the target body 104.

Figure 5:
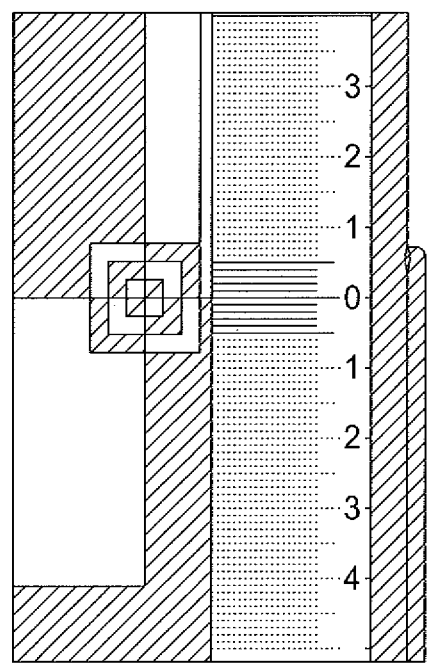
FIG. 5 illustrates an image that has been zoomed in on a portion of the ruler.

In step 314, the user determines whether the autofocus settings are properly calibrated for the camera and lens combination being tested. In one embodiment, this involves selecting an image captured by the camera and zooming the image in on the portion of the ruler 106 that is positioned adjacent to the target body 104. FIG. 5, for example, illustrates an image that has been zoomed in on a portion of the ruler 106. At the camera's maximum zoom, the numbered markings on the ruler 106 are examined to determine which marking is sharpest. The sharpest mark represents the center of focus, as defined by the camera and lens combination using the autofocus feature. If the autofocus settings are properly calibrated for the camera and lens combination, then the sharpest mark should be the mark numbered zero.

If the autofocus settings are not properly calibrated for the camera and lens combination being tested (i.e., the sharpest mark is a mark other than zero), it may be necessary to adjust the autofocus settings in step 316. It is necessary to identify whether the autofocus feature is front focusing or back focusing, and by how many markings on the ruler 106. The autofocus settings may then be adjusted, for example, by moving the autofocus adjustment setting the appropriate number of points forward or backward.

In step 318, the adjustments made to the autofocus settings are optionally stored in the camera. Specifically, the adjustments are stored with information for the camera and lens combination being tested. This allows the adjustments to be retrieved and duplicated the next time this camera and lens combination is used.

The method 300 terminates in step 320. It may be necessary to repeat at least steps 312-318 to determine whether an adjustment made in step 318 was correct and to further adjust, if necessary. The method 300 may also be repeated for multiple different camera and lens combinations, or repeated for the same camera and lens combinations on a periodic basis.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A test target for measuring a focus performance of a camera and lens combination, comprising:
  a target body, the target body displaying a pattern comprising:
    a primary pattern covering a portion of the target body; and
    a secondary pattern superimposed over a portion of the primary pattern, the secondary pattern being aligned along an edge of the target body; and
  a ruler positioned adjacent to the edge of the target body, such that the secondary pattern directly abuts a zero line of the ruler,
  wherein each of the primary pattern and the secondary pattern comprises a high contrast two-toned pattern,
  and wherein each of the primary pattern and the secondary pattern comprises:
    a square divided into four quadrants, wherein two of the four quadrants are black and two of the four quadrants are white, the two of the four quadrants that are black being positioned diagonally from each other and the two of the four quadrants that are white being positioned diagonally from each other; and
    a first perimeter surrounding the square, wherein a portion of the first perimeter that contacts that two of the four quadrants that are black is white, and a portion of the first perimeter that contacts that two of the four quadrants that are white is black.

2. The test target of claim 1, wherein the secondary pattern further comprises:
  a second perimeter surrounding the first perimeter, wherein a portion of the second perimeter that contacts a black portion of the first perimeter is white, and a portion of the second perimeter that contacts a white portion of the first perimeter is black.

3. The test target of claim 1, wherein the secondary pattern is superimposed over a portion of the first perimeter of the primary pattern and over portions of two of the four quadrants of the primary pattern that are closest to the ruler.

4. The test target of claim 1, wherein a size of the secondary pattern is less then or equal to approximately one fourth of a size of one of the four quadrants of the primary pattern.

5. The test target of claim 1, wherein the target body and the ruler are coupled to a common base.

6. The test target of claim 5, wherein the target body is coupled to the base by a first hinge, and the ruler is coupled to the base by a second hinge.

7. The test target of claim 6, wherein the first hinge allows the target body to be rotated from a position that lies flat with the base to at least a position that is orientated substantially perpendicular relative to the base.

8. The test target of claim 6, wherein the second hinge allows the ruler to be rotated from a position that lies flat with the base to at least a position that forms an acute angle relative to the base.

9. The test target of claim 5, further comprising:
  a tripod mount formed in the base.

10. The test target of claim 5, further comprising:
  a level formed in the base.

11. The test target of claim 10, wherein the level is a bubble level.

12. The test target of claim 1, wherein the target body and the ruler are formed of a plastic resin.

13. A method for calibrating an autofocus feature for a system comprising a camera and a lens, the method comprising:
  using the system to capture an image of a test target, the test target comprising:
    a target body, the target body displaying a pattern comprising:
      a primary pattern covering a portion of the target body; and
      a secondary pattern superimposed over a portion of the primary pattern, the secondary pattern being aligned along an edge of the target body; and
    a ruler positioned adjacent to the edge of the target body, such that the secondary pattern directly abuts a zero line of the ruler,
    wherein each of the primary pattern and the secondary pattern comprises a high contrast two-toned pattern,
    and wherein each of the primary pattern and the secondary pattern comprises:
      a square divided into four quadrants, wherein two of the four quadrants are black and two of the four quadrants are white, the two of the four quadrants that are black being positioned diagonally from each other and the two of the four quadrants that are white being positioned diagonally from each other; and a first perimeter surrounding the square, wherein a portion of the first perimeter that contacts that two of the four quadrants that are black is white, and a portion of the first perimeter that contacts that two of the four quadrants that are white is black; and adjusting the autofocus feature such that a sharpest portion of the image occurs at the zero line of the ruler.

14. The method of claim 13, wherein the using comprises:

aiming the system such that a focus point of the image is approximately at a center of the secondary pattern.

15. The test target of claim 1, wherein a horizontal center line of the primary pattern and the secondary pattern is substantially even with the zero line of the ruler.

16. The test target of claim 1, wherein the target body is substantially rectangular in shape.

* * * * *